(12) United States Patent
Lee et al.

(10) Patent No.: US 8,610,858 B2
(45) Date of Patent: Dec. 17, 2013

(54) THIN FILM TRANSISTOR ARRAY PANEL AND METHOD OF MANUFACTURING THE SAME

(75) Inventors: Seong-Young Lee, Anyang-si (KR); Dong-Gyu Kim, Yongin-si (KR); Yun-Jung Cho, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 429 days.

(21) Appl. No.: 12/842,580

(22) Filed: Jul. 23, 2010

(65) Prior Publication Data

US 2011/0096279 A1 Apr. 28, 2011

(30) Foreign Application Priority Data

Oct. 23, 2009 (KR) ........................ 10-2009-0101355

(51) Int. Cl.
*G02F 1/1343* (2006.01)

(52) U.S. Cl.
USPC .......................................................... 349/139

(58) Field of Classification Search
USPC .......................................................... 349/139
See application file for complete search history.

(56) References Cited

U.S. PATENT DOCUMENTS

| | | | |
|---|---|---|---|
| 2006/0139553 A1* | 6/2006 | Kang et al. | 349/149 |
| 2006/0139556 A1* | 6/2006 | Ahn et al. | 349/153 |
| 2008/0123007 A1 | 5/2008 | Cui et al. | |
| 2008/0239225 A1* | 10/2008 | Chen et al. | 349/139 |
| 2010/0103364 A1* | 4/2010 | Choi et al. | 349/157 |
| 2011/0001909 A1* | 1/2011 | Tseng et al. | 349/106 |

FOREIGN PATENT DOCUMENTS

| | | |
|---|---|---|
| JP | 10-048643 | 2/1998 |
| JP | 2002-182221 | 6/2002 |
| JP | 2005-309239 | 11/2005 |
| JP | 2007-192944 | 8/2007 |
| JP | 2008083291 | 4/2008 |
| JP | 2009-109656 | 5/2009 |
| KR | 1020040108417 | 12/2004 |
| KR | 1020060088242 | 8/2006 |
| KR | 1020060106333 | 10/2006 |
| KR | 1020070003122 | 1/2007 |
| KR | 1020070068577 | 7/2007 |

* cited by examiner

*Primary Examiner* — Timothy L Rude
(74) *Attorney, Agent, or Firm* — F. Chau & Associates, LLC

(57) ABSTRACT

A liquid crystal display device that is in a normally black mode where a screen is black when a voltage difference between a first insulating substrate and a second insulating substrate is zero, wherein a column spacer is positioned between the two substrates and the column spacer is in contact with a common voltage conductor pattern formed on the first insulating substrate and a common electrode formed on the second insulating substrate, such that a voltage difference between the common voltage conductor pattern and the common electrode is zero.

20 Claims, 7 Drawing Sheets

THIN FILM TRANSISTOR ARRAY PANEL AND METHOD OF MANUFACTURING THE SAME

CROSS-REFERENCE TO RELATED APPLICATION

This application claims priority to and the benefit of Korean Patent Application No. 10-2009-0101355 filed in the Korean Intellectual Property Office on Oct. 23, 2009, the entire contents of which are incorporated herein by reference.

BACKGROUND OF THE INVENTION (a) Technical Field

The present invention relates to a liquid crystal display device that is capable of light-blocking in a column spacer region without reducing an aperture ratio.

(b) Discussion of the Related Art

A liquid crystal display (LCD) device is a flat panel display device that is being widely used and includes two display panels where field generating electrodes such as a pixel electrode and a common electrode are formed, and a liquid crystal layer interposed between the two panels. The liquid crystal display device generates an electric field in the liquid crystal layer by applying voltages to the field generating electrodes, to determine orientations of liquid crystal molecules of the liquid crystal layer and control polarization of incident light, thereby displaying an image.

In a normally black vertical alignment (VA) mode LCD, when a difference in voltage between the two panels is zero, a black screen is implemented.

The two display panels of the liquid crystal display include a thin film transistor array panel and a common electrode substrate.

Signal line wires such as gate and data wires and a transparent pixel electrode are formed on the thin film transistor array panel. In addition, a common voltage wire, which may be made of the same material as the gate wire or the data wire, may also be formed on the thin film transistor array panel.

A color filter layer and/or a light-blocking black matrix layer are formed on the common electrode substrate. A transparent common electrode is formed on the color filter layer and/or the light-blocking black matrix layer. The same voltage that is applied to the common voltage wire on the thin film transistor array panel is applied to the transparent common electrode.

A column spacer for maintaining a cell gap may be disposed between the thin film transistor array panel and the common electrode substrate. However, the liquid crystal orientation is scattered in the vicinity of the column spacer to thereby generate light leakage and texture, resulting in deterioration of image quality. In order to prevent these effects, an opaque layer such as a black matrix, a gate wire, or the like for blocking light is formed in a column spacer region.

SUMMARY OF THE INVENTION

The opaque layer such as the black matrix, gate wire, or the like that is formed on the column spacer can cause transmittance to be deteriorated by reducing the aperture ratio of a pixel.

Accordingly, according to an aspect of the present invention, light in the column spacer region is blocked without reducing the aperture ratio.

An exemplary embodiment of the present invention provides a liquid crystal display device that is in a normally black mode where a screen is black when a voltage difference between a first insulating substrate and a second insulating substrate is zero, and wherein a column spacer is positioned between the two substrates and the column spacer is in contact with a common voltage conductor pattern formed on the first insulating substrate and a common electrode formed on the second insulating substrate, such that a voltage difference between the common voltage conductor pattern and the common electrode is zero.

The liquid crystal display device may be a normally black mode liquid crystal display device that includes the common voltage conductor pattern formed on the first insulating substrate and the column spacer formed on the conductor pattern, wherein the common electrode is formed on the second insulating substrate facing the first insulating substrate and the column spacer is in contact with the common electrode of the second insulating substrate.

Alternatively, the liquid crystal display device may be a normally black mode liquid crystal display device wherein the column spacer is formed on the common electrode on the second insulating substrate and is in contact with the common voltage conductor pattern formed on the first insulating substrate facing the second insulating substrate.

The common voltage conductor pattern may be transparent.

An organic film or a color filter may be formed between the common voltage conductor pattern and opaque metal wires such as the gate wire, the data wire, etc.

The common voltage conductor pattern may be wider than the column spacer so as to completely overlap a bottom surface area of the column spacer.

The column spacer area may include a part that overlaps an opaque metal wire and a part that does not overlap an opaque metal wire.

According to an aspect of the present invention, in a normally black mode display device where a screen is black when a voltage difference between two substrates is zero, a common voltage conductor pattern is formed on a first insulating substrate, a column spacer is formed on the conductor pattern, a common electrode is formed on a second insulating substrate facing the first insulating substrate, and the column spacer is in contact with the common electrode and the second insulating substrate. The same voltage is applied to the common voltage conductor pattern, the common electrode, and to a common voltage wire formed on the first insulating substrate.

Therefore, the column spacer is positioned between the common voltage conductor pattern on the first insulating substrate and the common electrode on the second insulating substrate, such that the same voltage is constantly applied to upper and lower parts of the column spacer. Therefore, since the column spacer area constantly implements a black state in the normally black mode display device, an additional light blocking pattern is not required.

Further, the common voltage conductor pattern to which the common voltage is applied is formed by the same transparent electrode as a pixel electrode positioned below an orientation film on the first insulating substrate, such that the common voltage conductor pattern is in electrical communication with the common electrode through the column spacer, thereby preventing a voltage difference between the common voltage conductor pattern of the first insulating substrate and the common electrode of the second insulating substrate from being generated.

In addition, according to an embodiment, the common voltage conductor pattern is larger than an area of the column spacer in order to completely overlap the area of the column spacer.

According to an embodiment, the common voltage conductor pattern and the opaque metal wire are superimposed on/overlap each other by forming a low dielectric constant layer such as an organic film, a color filter, or the like between the common voltage conductor pattern and the opaque metal wires such as the gate wire, the data wire, etc., thereby preventing the aperture ratio from being reduced even though the size of the common voltage conductor pattern increases.

As such, since the column spacer area is constantly black by applying the same voltage to upper and lower parts of the column spacer, the opaque metal wire does not need to be superimposed on/overlap the column spacer area.

Alternatively, even when the opaque metal wire is superimposed on/overlaps the column spacer area, the size of the opaque metal wire that is superimposed on/overlaps the column spacer area may be smaller than the size of the column spacer area.

DETAILED DESCRIPTION OF THE EMBODIMENTS

Figure 1:
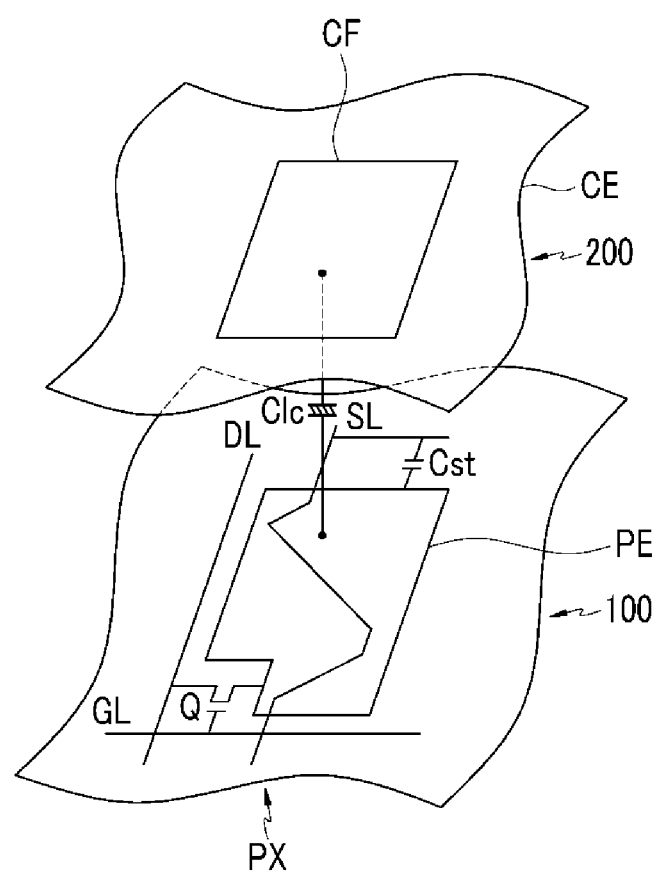
FIG. 1 is a conceptual diagram of a liquid crystal display device according to an exemplary embodiment of the present invention.

In the following detailed description, certain exemplary embodiments of the present invention have been shown and described. As those skilled in the art would realize, the described embodiments may be modified in various different ways without departing from the spirit or scope of the present invention. Like reference numerals designate same or similar elements throughout the specification. In the drawings, the thickness of layers, films, panels, regions, etc., may be exaggerated for clarity. It will be understood that when an element such as a layer, film, region, or substrate is referred to as being "on" another element, it can be directly on the other element or intervening elements may also be present. In addition, it will be understood that when an element such as a layer, film, region, or substrate is referred to as being "beneath" another element, it can be directly beneath the other element or intervening elements may also be present.

The disclosure does not illustrate an orientation film provided on each of an uppermost layer of a first insulating substrate and an uppermost layer of a second insulating substrate. However, contact with a common voltage conductor pattern or a common electrode may indicate contact with an orientation film provided on the common voltage conductor pattern or the common electrode.

Hereinafter, a thin film transistor array panel for a liquid crystal display device according to an exemplary embodiment of the present invention will be described in detail with reference to FIGS. 1 and 3.

FIG. 1 is a conceptual diagram of a liquid crystal display device according to an exemplary embodiment of the present invention.

The liquid crystal display device includes two display panels 100 and 200 including field generating electrodes such as a pixel electrode PE and a common electrode CE, and a liquid crystal layer (not shown) interposed between the two display panels 100 and 200. The liquid crystal display device generates an electric field in the liquid crystal layer by applying a voltage to the field generating electrodes such as the pixel electrode PE and the common electrode CE, to determine orientations of liquid crystal molecules of the liquid crystal layer and control polarization of incident light, thereby displaying an image.

In the liquid crystal display device in a normally black mode such as a vertically aligned mode, when a difference in voltage between the two display panels is zero, a black screen is implemented.

The two display panels of the liquid crystal display device include a thin film transistor array panel 100 and a common electrode substrate 200.

Signal lines such as gate wires GL and data wires DL, and a transparent pixel electrode PE, are formed on the thin film transistor array panel 100. In addition, a common voltage wire SL made of the same material as the gate wire GL or the data wire DL is formed on the thin film transistor array panel.

A color filter CF and/or black matrix layer (not shown in FIG. 1) is formed on the common electrode substrate. The transparent common electrode CE is formed on the color filter and/or the black matrix layer. The same voltage as a voltage applied to the common voltage wire SL on the thin film transistor array panel 100 is applied to the transparent common electrode CE.

A column spacer (not shown in FIG. 1) for maintaining a cell gap is disposed between the thin film transistor array panel 100 and the common electrode substrate 200.

A thin film transistor array panel according to an exemplary embodiment of the present invention will be described in further detail with reference to FIGS. 2 and 3.

Figure 2:
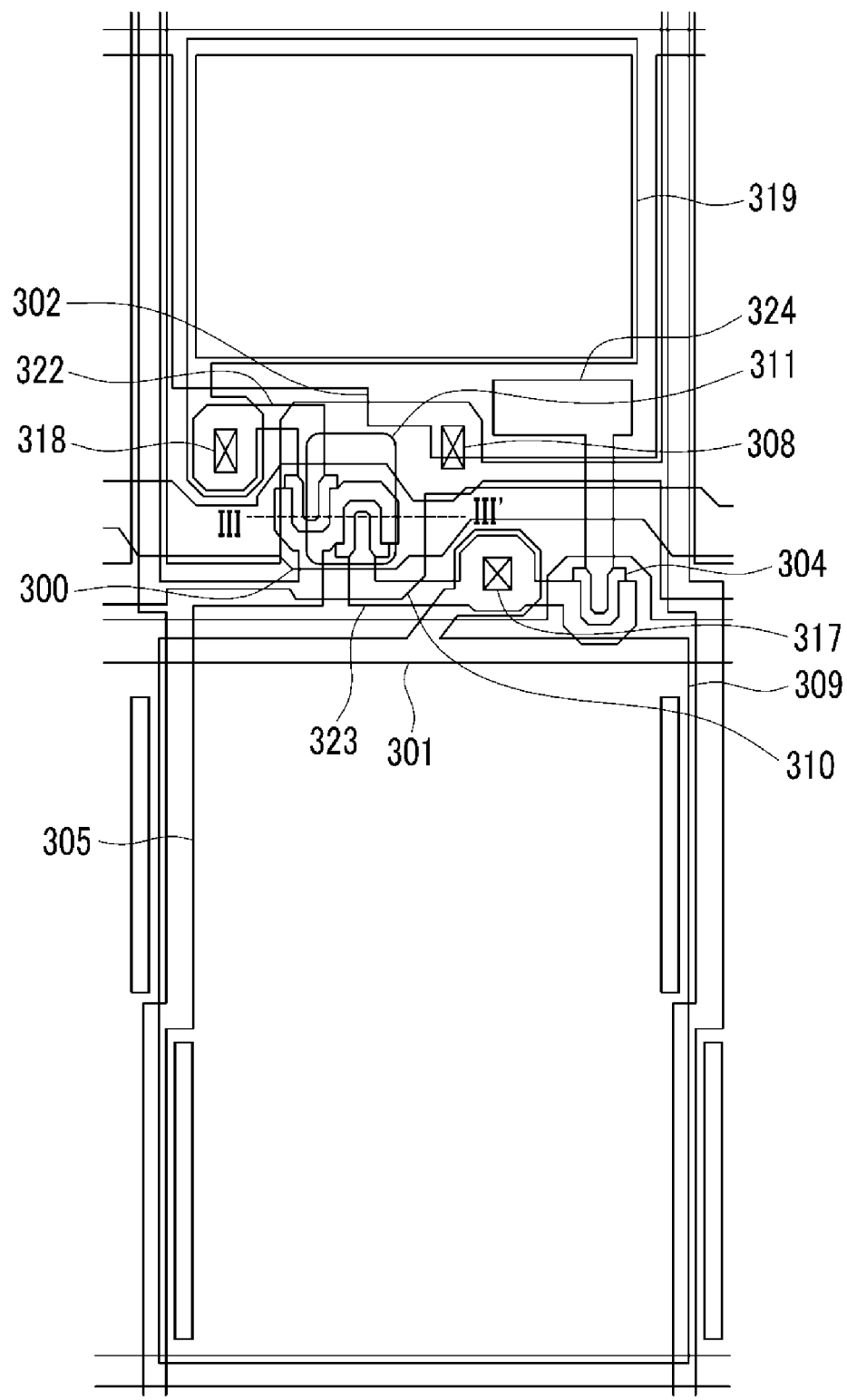
FIG. 2 is a layout view of a liquid crystal display device according to an exemplary embodiment of the present invention.
Figure 3:
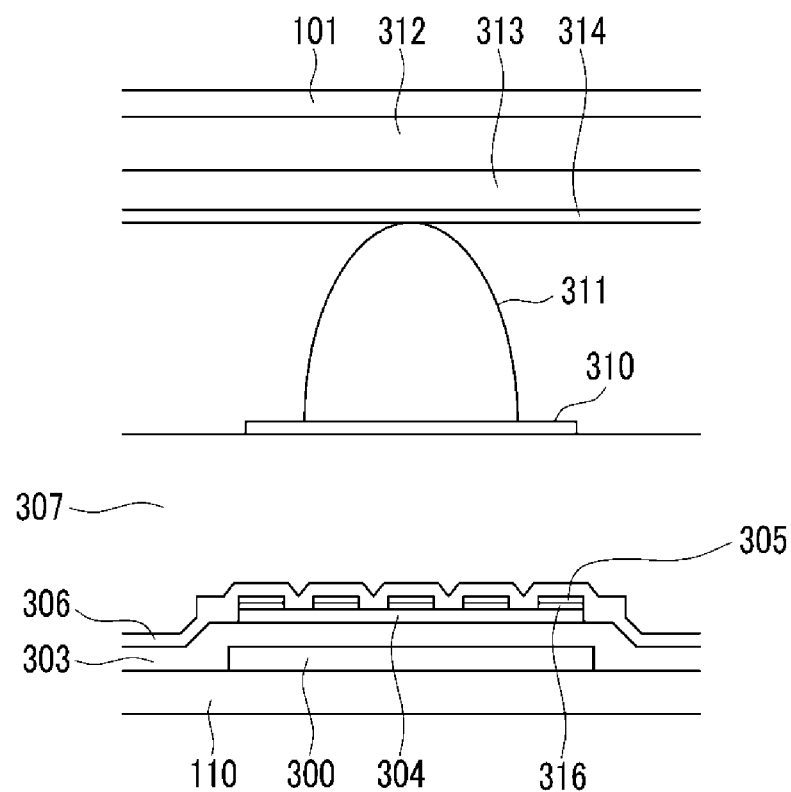
FIG. 3 is a cross-sectional view taken along line III-III' of FIG. 2.

FIG. 2 is a layout view of a liquid crystal display device according to an exemplary embodiment of the present invention, and FIG. 3 is a cross-sectional view taken along line III-III' in FIG. 2.

A gate wire 300 and common voltage wires 301 and 302 are formed on an insulation substrate 110 of the thin film transistor array panel 100. The common voltage wires 301 and 302 are formed simultaneously with the gate wire 300. According to an embodiment, a width of the gate wire 300 is not wide enough to completely overlap or conceal a column spacer 311 in a width direction of the gate wire 300, the column spacer being formed in a subsequent process.

A first insulating layer 303 is formed on the gate wire 300 and the common voltage wires 301 and 302. A semiconductor layer 304 made of, for example, amorphous silicon, is formed on the first insulating layer 303. An ohmic contact layer 316 made of, for example, amorphous silicon, which is doped with n-type impurities, is formed on the semiconductor layer 304. A data wire 305 including a data line, a source electrode, drain electrodes 322 and 323, and a voltage dropping electrode 324 is formed on the ohmic contact layer 316. A second insulating layer 306 is formed on the data wire 305, and a third insulting layer 307 is formed on the second insulating layer 306. The first insulating layer 303 and the second insulating layer 306 may be made of inorganic materials such as silicon nitride (SiNx), silicon oxide (SiO$_2$), etc., and the third insulating layer 307 may be made of an organic material. The first insulating layer 303, the second insulating layer 306, and the third insulating layer 307 include a contact hole 308 exposing the common voltage wire 302. The second insulating layer 306 and the third insulating layer 307 have contact holes 317 and 318 exposing the two drain electrodes 323 and 322, respectively.

Pixel electrodes 309 and 319 made of a transparent conductive material and a common voltage conductor pattern 310 are formed on the third insulating layer 307. The common voltage conductor pattern 310 is electrically connected with the common voltage wire 302 through the contact hole 308, and the two pixel electrodes 309 and 319 are electrically connected with the two drain electrodes 322 and 323 through the contact holes 318 and 317, respectively.

A column spacer 311 is formed on the common voltage conductor pattern 310. The column spacer 311 may be made of an organic material. According to an embodiment, the common voltage conductor pattern 310 is wider than the bottom surface of the column spacer 311 in order to cover an entire area of the column spacer.

The column spacer area is an area occupied by the bottom surface of the column spacer.

According to an embodiment, an opaque metal wire is not disposed in an area where the column spacer 311 is positioned. Alternatively, if an opaque metal wire is disposed in an area where the column spacer 311 is positioned, the dimensions of the opaque metal wire superimposed on/overlapping the column spacer 311 are smaller than the column spacer area.

According to an embodiment, the common voltage conductor pattern 310 and the opaque metal wire are superimposed on/overlap each other by forming a low dielectric constant layer such as an organic film, a color filter, or the like between the common voltage conductor pattern 310 and the opaque metal wires such as the gate wire 300, the data wire 305, etc. As a result, the aperture ratio is prevented from being reduced even though the size of the common voltage conductor pattern 310 increases.

The common electrode substrate 200 includes an insulating substrate 101 and a color filter 312, an overcoat layer 313, and a common electrode 314 that are sequentially formed on the insulating substrate 101.

The column spacer 311 maintains a gap between the two substrates 100 and 200 in a state where the common electrode substrate 200 and the thin film transistor array panel 100 are arranged and coupled with each other.

When the common electrode 314 and the common voltage conductor patter 310 to which the same voltage is applied are formed at upper and lower parts of the column spacer 311, liquid crystal molecules around the column spacer 311 maintain a vertical orientation state to maintain the black state. Since polarization of light passing through the column spacer 311 does not vary, all light beams are blocked by an orthogonally disposed vertical polarizing plate to maintain the black state.

Figure 4:
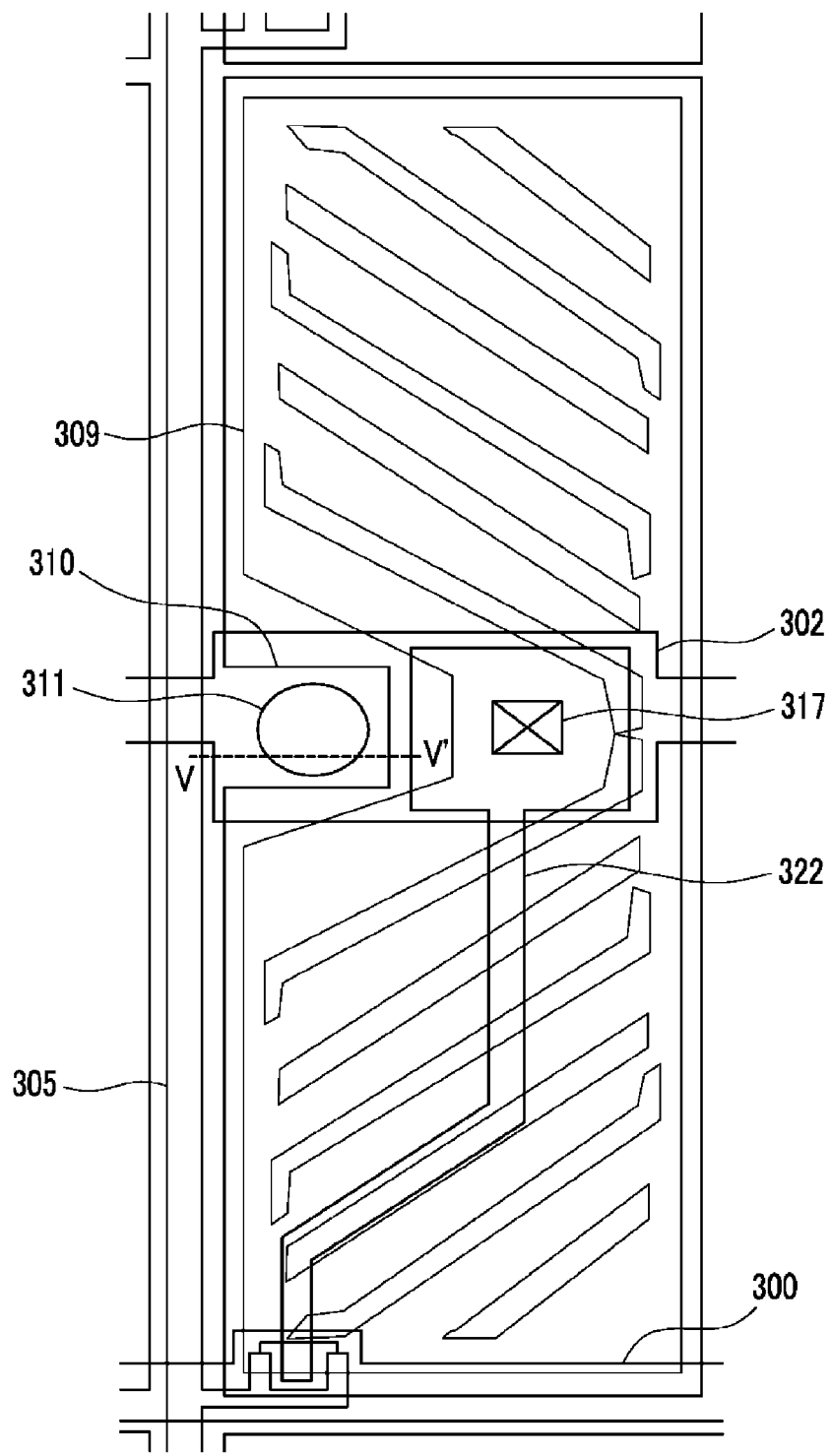
FIG. 4 is a layout view of a liquid crystal display device according to an exemplary embodiment of the present invention.
Figure 5:
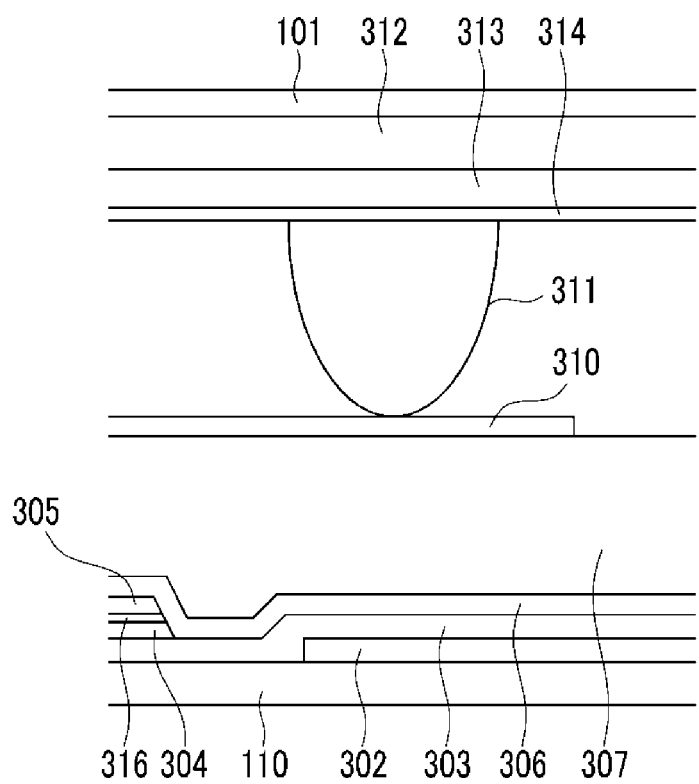
FIG. 5 is a cross-sectional view taken along line V-V' of FIG. 4.

According to an embodiment, two pixel electrodes 309 and 319 connected to the same first thin film transistor are disposed in one pixel and the common voltage conductor pattern 310 is applied to the thin film transistor array panel having a structure to connect the voltage dropping electrode 324 to one pixel electrode 309 through a second thin film transistor. Alternatively, the common voltage conductor pattern 310 may be applied to a thin film transistor array panel having another structure as further described below. FIG. 4 is a layout view of a liquid crystal display device according to an exemplary embodiment of the present invention, and FIG. 5 is a cross-sectional view taken along line V-V' in FIG. 4.

The gate wire 300 and the common voltage wire 302 are formed on the insulating substrate 110. The common voltage wire 302 is positioned away from two adjacent gate wires 300 by equal distances, and has a part of which the width is increased.

The first insulating layer 303 is formed on the gate wire 300 and the common voltage wire 302. The semiconductor layer 304 made of, for example, amorphous silicon, etc., is formed on the first insulating layer 303. An ohmic contact layer 316 made of, for example, amorphous silicon, which is doped with n-type impurities, is formed on the semiconductor layer 304. The data wire 305 including the data line, the source electrode, and the drain electrode 322 that are made of metal is formed on the ohmic contact layer 316. The second insulating layer 306 is formed on the data wire 305 and the third insulating layer 307 is formed on the second insulating layer 306. The first insulating layer 303 and the second insulating layer 306 may be made of inorganic materials such as silicon nitride (SiNx), silicon oxide (SiO$_2$), etc., and the third insulating layer 307 may be made of an organic material. The second insulating layer 306 and the third insulating layer 307 have the contact hole 317 exposing the drain electrode 322.

The pixel electrode 309 and the common voltage conductor pattern 310 that are made of a transparent conductive material are formed on the third insulating layer 307. The pixel electrode 309 is electrically connected with the drain electrode 322 through the contact hole 317, and has a cut part that is symmetrical with respect to the common voltage wire 302. The common voltage conductor pattern 310 extends over the data line and has a protrusion portion that is superimposed on/overlaps a part where the width of the common voltage wire 302 is increased. The common voltage conductor pattern 310 extends up to an adjacent area away from the screen display area and is wired to apply the same voltage as the common voltage wire 302 through a wire or a driving circuit that is formed in the adjacent area.

The common electrode substrate includes the insulating substrate 101 and the color filter 312, the overcoat layer 313, and the common electrode 314 that are formed on the insulating substrate 101 in sequence. The column spacer 311 is sequentially formed on the common electrode 314. The column spacer 311 is disposed in contact with the common voltage conductor pattern 310 formed on the thin film transistor insulating substrate.

Figure 6:
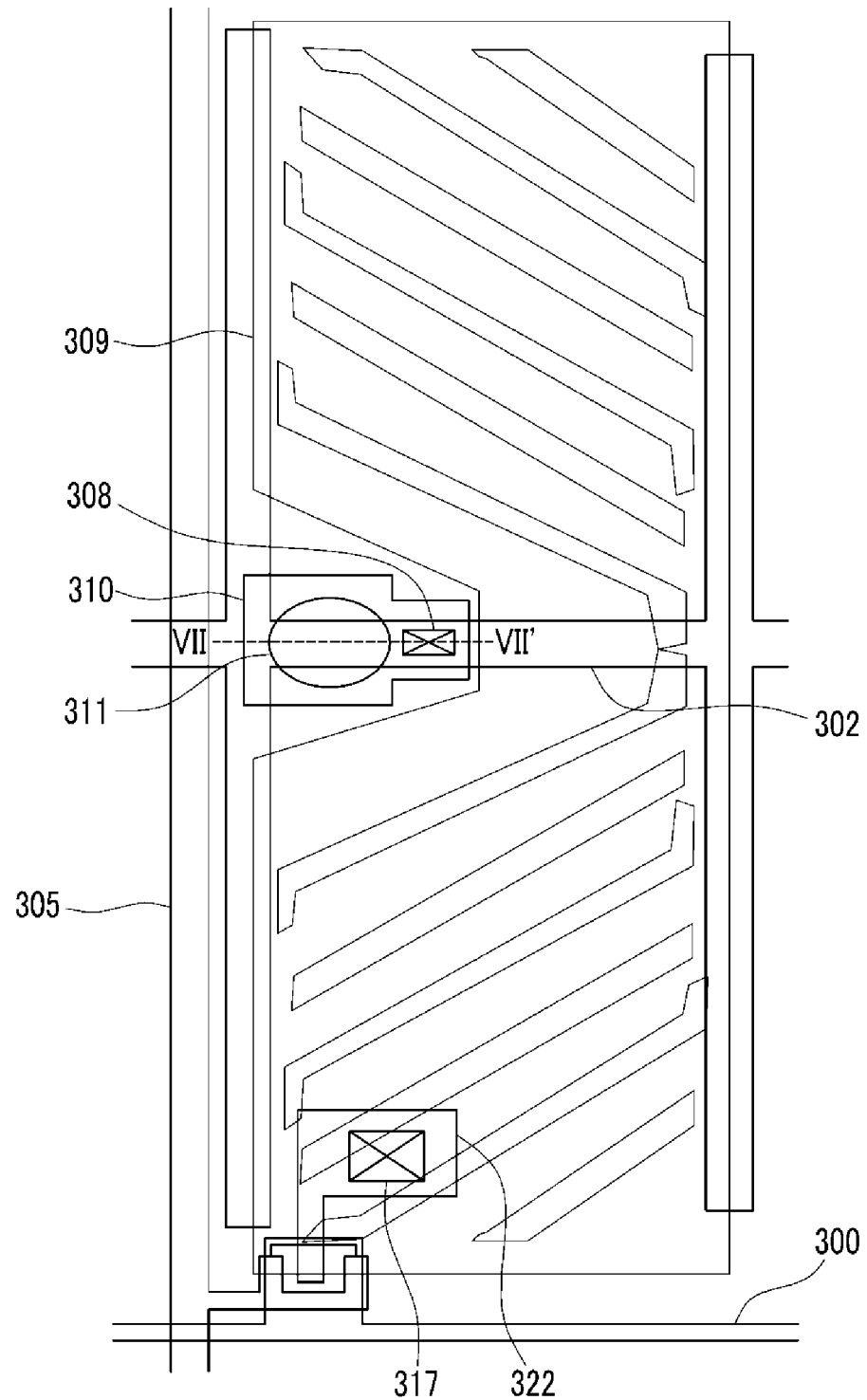
FIG. 6 is a layout view of a liquid crystal display device according to an exemplary embodiment of the present invention.
Figure 7:
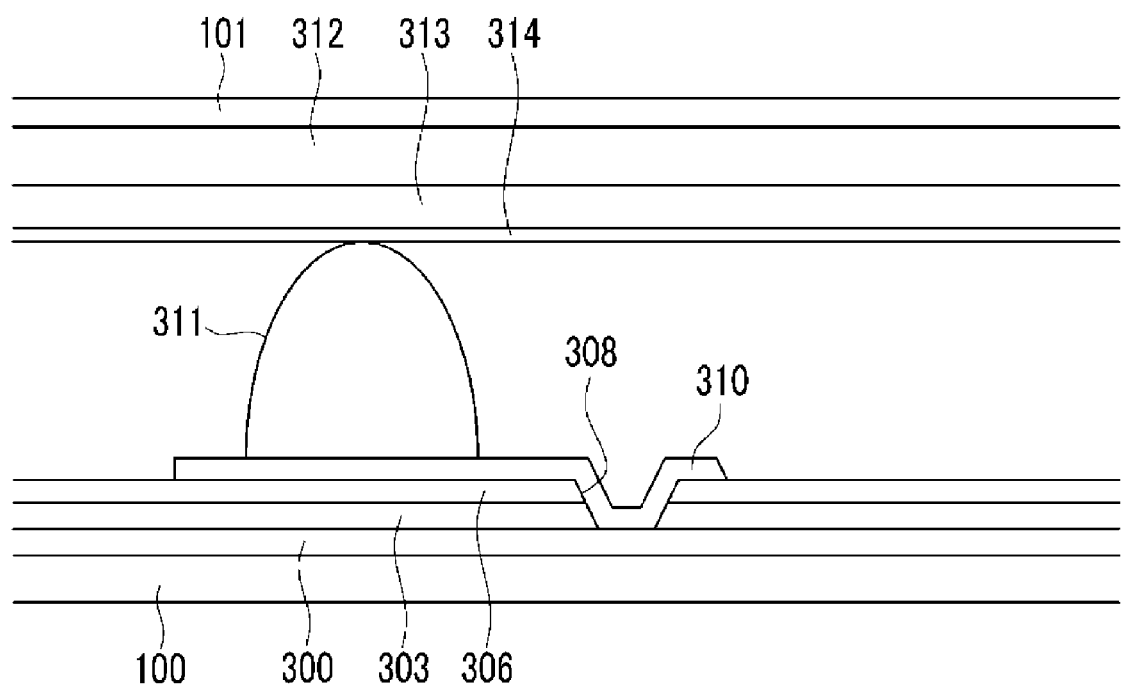
FIG. 7 is a cross-sectional view taken along line VII-VII' of FIG. 6.

FIG. 6 is a layout view of a liquid crystal display device according to an exemplary embodiment of the present invention, and FIG. 7 is a cross-sectional view taken along line VII-VII' in FIG. 6.

The gate wire 300 and the common voltage wire 302 are formed on the insulating substrate 110. The common voltage wire 302 is positioned away from two adjacent gate wires 300 by equal distances and extends to have a branch part that is superimposed on/overlaps a side of the pixel electrode 309 that is adjacent to the data wire. According to an embodiment, the width of the common voltage wire 302 is increased at the branch part.

The first insulating layer 303 is formed on the gate wire 300 and the common voltage wire 302. A semiconductor layer (not shown) made of, for example, amorphous silicon, etc., is formed on the first insulating layer 303. An ohmic contact layer made of, for example, amorphous silicon, which is doped with n-type impurities, is formed on the semiconductor layer. The data wire 305 including the data line, the source electrode, and the drain electrode 322 that are made of metal is formed on the ohmic contact layer. The second insulating layer 306 is formed on the data wire 305 and the third insulating layer 307 is formed on the second insulating layer 306. The first insulating layer 303 and the second insulating layer 306 may be made of inorganic materials such as silicon nitride (SiNx), silicon oxide ($SiO_2$), etc., and the third insulating layer 307 may be made of an organic material. The first insulating layer 303, the second insulating layer 306, and the third insulating layer 307 include a contact hole 308 exposing the common voltage wire 302. The second insulating layer 306 and the third insulating layer 307 include a contact hole 317 exposing the drain electrode 322.

The pixel electrode 309 and the common voltage conductor pattern 310 that are made of transparent conductive material are formed on the third insulating layer 307. The pixel electrode 309 is electrically connected with the drain electrode 322 through the contact hole 317, and includes a cut part that is symmetrical with respect to the common voltage wire 302. The common voltage conductor pattern 310 has an island shape, which is superimposed on/overlaps the common voltage wire 302 and is electrically connected with the common voltage wire 302 through the contact hole 308. Accordingly, the same voltage as the common voltage wire 302 is applied to the common voltage conductor pattern 310.

The column spacer 311 made of an organic material is formed on the common voltage conductor pattern 310.

The common electrode substrate includes the insulating substrate 101 and the color filter 312, the overcoat layer 313, and the common electrode 314 that are sequentially formed on the insulating substrate 101.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope as set forth in the appended claims.

What is claimed is:

1. A normally black mode liquid crystal display device, comprising:
    a first insulating substrate including a common voltage conductor pattern formed on the first insulating substrate;
    a second insulating substrate including a common electrode formed on the second insulating substrate; and
    a column spacer disposed between the common voltage conductor pattern and the common electrode, wherein the common voltage conductor pattern and the common electrode overlap and the column spacer maintains a gap between the first insulating substrate and the second insulating substrate,
    wherein the same voltage is applied to the common voltage conductor pattern and the common electrode,
    wherein a first pixel electrode and a second pixel electrode are connected with a first thin film transistor, a second thin film transistor is connected with the second pixel electrode, and a voltage dropping electrode is connected to the second thin film transistor.

2. The liquid crystal display device of claim 1, wherein the common voltage conductor pattern is made of transparent conductive material.

3. The liquid crystal display device of claim 2, wherein the common voltage conductor pattern is wider than the column spacer.

4. The liquid crystal display device of claim 3, wherein at least part of an area of the column spacer does not overlap an opaque metal wire.

5. The liquid crystal display device of claim 4, wherein the opaque metal wire includes a gate wire and a data wire, and an organic film or a color filter is disposed between the common voltage conductor pattern and the gate wire and the data wire.

6. The liquid crystal display device of claim 5, wherein a common electrode wire is formed on the same layer as the gate wire,
    wherein the organic film or color filter includes a contact hole exposing the common electrode wire and the common voltage conductor pattern is electrically connected with the common electrode wire through the contact hole.

7. The liquid crystal display device of claim 2, wherein at least part of an area of the column spacer area does not overlap an opaque metal wire.

8. The liquid crystal display device of claim 7, wherein the opaque metal wire includes a gate wire and a data wire, and an organic film or a color filter is disposed between the common voltage conductor pattern and the gate wire and the data wire.

9. The liquid crystal display device of claim 2, wherein an opaque metal wire overlaps only a part of an area of the column spacer and includes a gate wire and a data wire, and an organic film or a color filter is disposed between the common voltage conductor pattern and the gate wire and the data wire.

10. The liquid crystal display device of claim 9, wherein a common electrode wire is formed on the same layer as the gate wire, and
    the organic film or color filter has a contact hole exposing the common electrode wire and the common voltage conductor pattern is electrically connected with the common electrode wire through the contact hole.

11. The liquid crystal display device of claim 1, wherein the common voltage conductor pattern is wider than the column spacer.

12. The liquid crystal display device of claim 11, wherein at least part of an area of the column spacer does not overlap an opaque metal wire.

13. The liquid crystal display device of claim 12, wherein the opaque metal wire includes a gate wire and a data wire, and an organic film or a color filter is disposed between the common voltage conductor pattern and the gate wire and the data wire.

14. The liquid crystal display device of claim 1, wherein at least part of an area of the column spacer does not overlap an opaque metal wire.

15. The liquid crystal display device of claim 14, wherein the opaque metal wire includes a gate wire and a data wire, and an organic film or a color filter is disposed between the common voltage conductor pattern and the gate wire and the data wire.

16. The liquid crystal display device of claim 1, wherein an opaque metal wire overlaps only a part of an area of the column spacer and includes a gate wire and a data wire, and a color filter is disposed between the common voltage conductor pattern and the gate wire and the data wire.

17. The liquid crystal display of claim 1, wherein an area of the column spacer contacting the common voltage conductor pattern is larger than an area of the column spacer contacting the common electrode.

18. A normally black mode liquid crystal display device, comprising:
- a first insulating substrate including a common voltage conductor pattern formed on the first insulating substrate;
- a second insulating substrate including a common electrode formed on the second insulating substrate;
- a column spacer disposed between the common voltage conductor pattern and the common electrode, wherein the common voltage conductor pattern is wider than the column spacer;
- an opaque metal wire overlapping a part of an area of the column spacer; and
- a low dielectric constant layer disposed between the common voltage conductor pattern and the opaque metal wire,
- wherein the same voltage is applied to the common voltage conductor pattern and the common electrode,
- wherein a first pixel electrode and a second pixel electrode are connected with a first thin film transistor, a second thin film transistor is connected with the second pixel electrode, and a voltage dropping electrode is connected to the second thin film transistor.

19. The liquid crystal display device of claim 18, wherein the low dielectric constant layer includes a color filter.

20. The liquid crystal display of claim 18, wherein an area of the column spacer contacting the common voltage conductor pattern is larger than an area of the column spacer contacting the common electrode.

* * * * *